United States Patent [19]
Komatsu et al.

[11] 3,926,866
[45] Dec. 16, 1975

[54] PROCESS FOR PRODUCTION OF RIGID POLYURETHANE FOAM AND PRODUCT FOR USE AS ENERGY ABSORBING MATERIAL

[75] Inventors: Noboru Komatsu, Toyoakeshi; Toshio Kurauchi, Nagoya; Makoto Murase, Nagoya; Kazuhiko Negi, Nagoya, all of Japan

[73] Assignee: Kabushiki Kaisha Toyota Chuo Kenkyusho, Nagoya, Japan

[22] Filed: June 6, 1974

[21] Appl. No.: 477,111

[30] Foreign Application Priority Data
June 6, 1973 Japan................................ 48-63546

[52] U.S. Cl................ 260/2.5 AH; 180/89; 252/182
[51] Int. Cl.².......................................... C08G 18/14
[58] Field of Search.............................. 260/2.5 AH

[56] References Cited
FOREIGN PATENTS OR APPLICATIONS
| | | |
|---|---|---|
| 839,184 | 6/1960 | United Kingdom........... 260/2.5 AH |
| 974,986 | 11/1964 | United Kingdom........... 260/2.5 AH |
| 1,087,081 | 10/1967 | United Kingdom........... 260/2.5 AH |
| 1,156,783 | 7/1969 | United Kingdom........... 260/2.5 AH |

OTHER PUBLICATIONS

Encyclopedia of Polymer Science & Technology, Vol. 15, John Wiley, New York, (1971) pp. 445–462.
Boudreau—How Silicone Surfactants etc., Plastics Engineering, Jan. 1967, pp. 133–136, 143–145, 234, 239 and 240.

*Primary Examiner*—H. S. Cockeram
*Attorney, Agent, or Firm*—Blum Moscovitz Friedman & Kaplan

[57] ABSTRACT

A process for producing a rigid polyurethane foam for use as an energy-absorbing material is modified in that an organosilicone oil is added. When foaming takes place, the foam produced has substantially larger bubbles than conventional foams. Furthermore, the product produced has greater capacity for absorption of kinetic energy.

7 Claims, 7 Drawing Figures

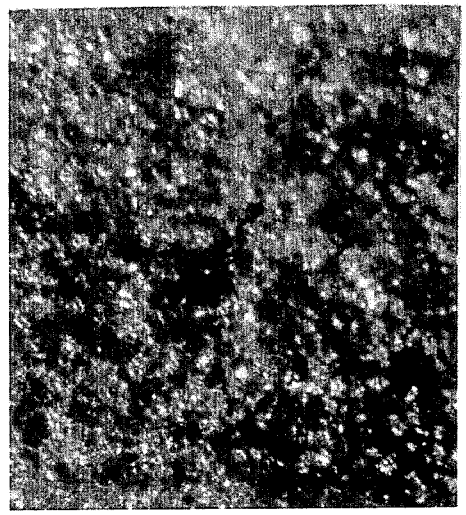
FIG. 5
FIG. 6
FIG. 7
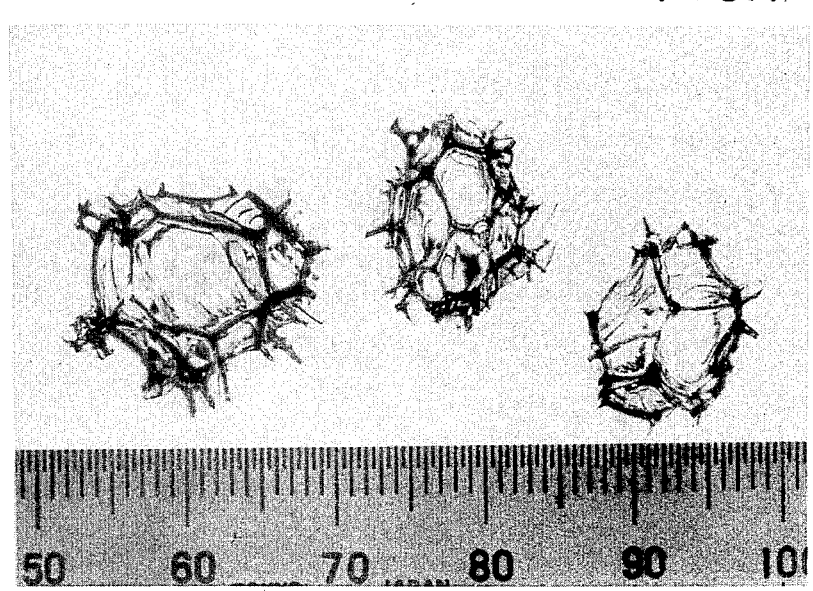

PROCESS FOR PRODUCTION OF RIGID POLYURETHANE FOAM AND PRODUCT FOR USE AS ENERGY ABSORBING MATERIAL

BACKGROUND OF THE INVENTION

Energy absorbing materials are used in automobiles, aircrafts, ships and the like at such regions against which it is anticipated that an occupant may be thrown or impelled as a result of collision in a traffic accident and the like. The purpose is to protect the occupant from being injured. In such cases, the energy absorbing materials are compressed and deformed by impact with said occupant, and as a result of such deformation, kinetic energy developed by the occupants is absorbed, thereby damping the shock.

Thus, energy absorbing materials are required to possess the following two properties: (1) they must be able to deform within the range of an impact load such that a human body is not injured; and (2) they must be able to absorb as much as possible of the kinetic energy of the occupants, thereby moderating the shock of the crash.

Energy absorbing materials having the aforenoted properties, in addition should have the characteristics that the resistance to deformation, or "load," rapidly increases with a small displacement which occurs during the initial phase immediately after collision. Moreover, the load must level off at a value within the range in which a human body is not materially injured. After this, the load remains essentially constant over a range of displacement such that a large amount of kinetic energy is absorbed.

While foams have been known to be valuable in the protection of fragile objects as well as humans by reason of their ability to absorb kinetic energy through deformation, it has hitherto been difficult, if not impossible, to obtain foams giving suitably flat plateaus which can be readily controlled at levels such that a human body is not injured when thrown in contact therewith and which yet can absorb large amounts of energy, this latter requirement involving the further requirement that the displacement during absorption of energy be as great as possible. The present invention is intended to eliminate this problem by making available foams which have flat plateaus, i.e., essentially constant resistance to displacement (subsequent to a small initial displacement during which strain is approximately proportional to stress), thereby maximizing the quantity of kinetic energy which can be absorbed, commensurate with the thickness of the foam.

SUMMARY OF THE INVENTION

In the usual process for producing a rigid polyurethane foam for use as an energy absorbing material, a polyol is combined with an isocyanate as a cross-linking agent, a blowing agent such as Freon, a chlorofluorohyrocarbon, a catalyst for promoting the reaction of the polyol with the isocyanate and a bubble-stabilizing agent for aiding in uniform bubble formation. The foams produced by this means have cells with an average diameter of about 0.3 mm. However, if a diorganosilicone oil represented by the formula $R_2SiO$ wherein R represents a monovalent group and silica are added to the polyol prior to mixing with the other ingredients, then a rigid polyurethane foam is formed having closed cells with substantially larger diameters. By varying the quantity of oil and silica added the cell diameter may be increased to beyond 14 mm. The most useful range of additives consisting of diorganosilicone oil and silica is between 0.003 and 0.02 parts by weight per 100 parts by weight of polyol. The most useful range of mean cell sizes is between 3 and 10 mm, although foams with mean cell sizes up to 13 mm are also useful. The most useful ranges of diorganosilicone oil to silica ratios is 1:1 to 1:2.

Accordingly, an object of the present invention is an improved process for manufacturing foam having maximum capacity for absorption of kinetic energy in a collision with a human body without injury to said human body.

Another object of the present invention is an improved process for manufacturing a rigid foam incorporating a diorganosilicone oil and silica.

A further object of the present invention is an improved process for the manufacture of a rigid foam for absorption of kinetic energy wherein a diorganosilicone oil and silica are added in the form of an emulsion.

Yet another object of the present invention is an improved process for the manufacture of a rigid foam for the absorption of kinetic energy without injury to a human body wherein the maximum resistance to collision with a human body exerted by the foam can be selected by proper proportion of the ingredients forming said foam.

A significant object of the present invention is an improved rigid foam for the absorption of the maximum possible amount of kinetic energy from a human body without injury thereto.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawings, in which:

FIG. 5 is a photograph of the appearance of the structure of rigid polyurethane foams prepared in accordance with the prior art the magnification being 5X;

FIG. 6 is a photograph of the appearance of the structure of a rigid polyurethane foam made in accordance with the present invention the magnification being 5X; and FIG. 7 is a photograph of the appearance of closed cells in a rigid polyurethane foam prepared in accordance with the process of the present invention shown with a mm scale.

DESCRIPTION OF THE PREFERRED EMBODIMENTS

Figure 1:
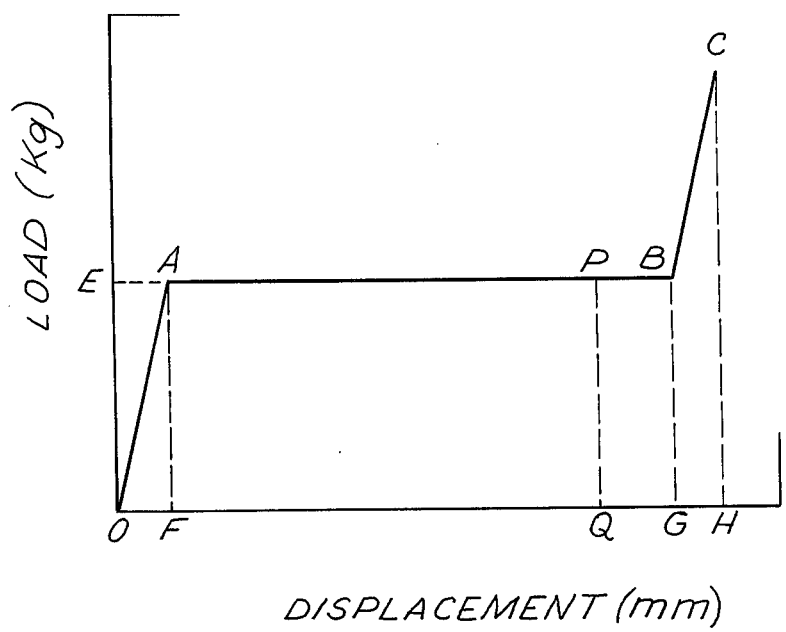
FIG. 1 is an ideal load-displacement curve for a rigid foam during the absorption of kinetic energy.

FIG. 1 illustrates an ideal characteristic curve for energy-absorbing materials, wherein the abscissa represents the amount of displacement of an energy absorbing material during deformation cuased by impact with a body, and the ordinate gives the amount of load, i.e., the resistance to deformation. At the beginning of receiving the impact load, the above ideal characteristic curve exhibits a sharp rise as shown by the line $\overline{OA}$, which means that the impact load rapidly increases with the initial small displacement represented by $\overline{OF}$. The rise continues until the load reaches a predetermined value $\overline{OE}$ within the range in which the human body is not injured. Then the characteristic curve shows plateau displacement as shown by $\overline{AB}$ in which the load $\overline{OE}$ stays constant until the displacement reaches a predetermined value $\overline{OG}$ which depends, in part, on the thickness of the piece subjected to load. The load $\overline{OE}$ and the displacement $\overline{OG}$ at the plateua portion will be hereinafter referred to as the plateau load and the plateau displacement, respectively.

The amount of displacement of a material due to the compressive deformation cannot exceed the thickness of the material. So, in practice, the characteristic curve shows another sharp rise as shown by the line $\overline{BC}$ before the displacement reaches the thickness of a material.

When the load applied to an energy absorbing material is equal to or less than the load $\overline{OE}$, the characteristic curve rises along the line $\overline{OA}$, and recovery takes place along the line $\overline{AO}$ when the shock is ended, and there is little if any plastic deformation, whereas, when the shock is greater than $\overline{OE}$, the operating point proceeds along the line $\overline{AB}$, (wherein the load is not increased beyond $\overline{OE}$ and only the displacement is increased). If the shock were to be ended at the point P, the maximum displacement of the energy absorber would be $\overline{OQ}$, and the total amount of kinetic energy absorbed by said energy absorber would be equivalent to the area of the quadrilateral whose apices are points OAPQ. In such a case, the maximum load acting on the occupant is equal to the plateau load $\overline{OE}$. Therefore, an ideal energy absorbing material is one having as long a plateau displacement as possible within the range of the thickness of the energy absorbing material and within the range of the load such that a human body is not injured. Especially it is desired to protect a human body. A small difference in the amount of energy absorbed may exert a significant influence on a human body. Thus, it is desired to have an energy absorbing material which gives as long a plateau displacement as possible.

While rigid polyurethane foams are mainly used as thermal insulators, synthetic woods and the like, they show a load-displacement curve similar to that shown in FIG. 1 and they have been found to be excellent energy absorbing materials. According to the present invention, the plateau displacement in the characteristic curve is further increased as compared with products of the prior art. Thus, the present invention provides energy absosrbing materials which are almost ideal from the viewpoints aforementioned.

A rigid polyurethane foam has a so-called "closed-cell" structure and is conventionally made from raw materials including a polyol as a resin, an isocyanate as a cross-linking agent, a blowing agent, a catalyst for promoting the reaction between the polyol and the isocyanate, and a bubble-stabilizing agent which is used to provide uniform dispersion of bubbles. Typically, from economical and industrial viewpoints, diphenylmethane-diisocyanate or tolylenediisocyanate are used as the isocyanate, Freon as the blowing agent, amines as the catalyst and silicone as a bubble-stabilizing agent. The mixture of these materials (hereinafter referred to as the basic raw materials) is foamed in a mold to obtain a rigid polyurethane foam.

The rigid polyurethane foam thus prepared shows a load-displacement curve similar to that as shown in FIG. 1. Density can be controlled by selecting a mold capacity properly and controlling the amount of raw materials charged into the mold to give a desired expansion ratio. The plateau load in the characteristic curve increases as the density increases, and the former decreases as the latter decreases. The plateau load can therefore be controlled by controlling the density, the value of the plateau load being selected to be within the range in which the human body is not injured. As is clear from the above explanation, rigid polyurethane foam is an excellent energy absorbing material, but it has previously been difficult to obtain long plateaus.

The present inventors have found that the diameter of the cells formed in the rigid polyurethane foam is one of the most significant factors in determining the length of the plateau displacement. A novel process has been found for production of an improved rigid polyurethane foam having closed-cells with significantly larger diameter, as compared with the prior art products. Tests have confirmed that the novel type of polyurethane foam shows a characteristic curve such that the plateau displacement is much greater than that of the prior art products.

The cell diameter is conventional rigid polyurethane foams which are made from only such basic raw materials as mentioned above is about 0.3 mm, regardless of the expansion ratio. In contrast, the rigid polyurethane foam of the present invention contains cells of a larger diameter ranging from 3 mm to 13 mm.

The object of the present invention can be accomplished by foaming the mixture consisting of the above-mentioned basic raw materials commonly used for the production of a rigid polyurethane foam together with a suitable amount of an additive composed of a mixture of diorganosilicone oil represented by the formula $R_2SiO$, wherein R represents a monovalent group such as a hydrocarbon group selected from the group consisting of a methyl group, an ethyl group and a phenyl group, or a substituted hydrocarbon group selected from the group consisting of a trifluoropropyl group and a trichloroethyl group, with silica ($SiO_2$). Very small amounts of oxides of magnesium, aluminum, sodium, titanium, iron, calcium, zinc and the like may be included as impurities in said additive. The aforesaid additive may also be used in the form of an emulsion made by mixing same with water.

The aforesaid types of additives are generally called oil compound-type or emulsion-type antifoaming agents of the silicone system, and are commonly used as antifoaming agents in processes of the food industry, petroleum chemistry, the lubricant industry, the paint industry and the like. In contrast, in the practice of the present invention, the same additive is used for a different purpose, based on the present inventors' discovery that adding such an additive to said basic raw materials significantly enlarges the cell diameter in the finished product.

The proper amount of the aforesaid additive to be employed in the practice of the present invention is in the range of 0.003 – 0.02 parts by weight per 100 parts by weight of polyol used, where the term polyol is used to describe a linear polymer having hydroxyl groups as ends groups. When such an additive is used in an amount less than 0.003 parts by weight, no substantial improvement in the increase in cell diameter results. The cell diameter increases as the amount of additive increases, but when the amount of additive exceeds 0.02 parts by weight, the cell diameter, after foaming, may be as large as 14 mm or so, which may lead to the collapse of cell walls, thereby failing to provide satisfactorily rigid polyurethane foam. Although satisfactory foams can be obtained even in cases in which the cell diameter is above about 10 mm, the energy absorbing capacity decreases in such cases. Thus the effective upper limit of the amount of an additive is 0.02 parts by weight.

In practicing the production of rigid polyurethane foam from the materials as mentioned above, they are well mixed together and formed in a mold. Density can be controlled by varying the gas expansion ratio, i.e., the weight per unit of mold volume. The foam density and the cell diameter are important factors in establishing the plateau load in the characteristic curve. As aforenoted, the plateau load increases as the density increases. If the density is held constant, the plateau load decreases as the cell diameter increases. When the product is intended to be used as an energy absorber, the plateau load should be selected to be within the range such that the human body is not significantly injured on collision therewith. According to experiments carried out by the inventors, rigid polyurethane foam having a density in the range of 0.02 – 0.2 g/cm$^3$ and a cell diameter in the range of 3–13 mm and preferably 3 – 10 mm obtained according to the process of the present invention is a very effective material for use as an interior finish member of automobiles and the like, the foam functioning as an energy absorber to protect an occupant from damage by shock. The density and the cell diameter are selected in accordance with the impact-resisting ability of the part of a human body which would undergo the impact. Namely, when the energy absorbing materials are to be used at those portions against which such parts of a human body having relatively poor impact-resisting ability would be thrown, materials having relatively low densities and relatively large cell diameters are chosen within each range as mentioned above. When the energy absorbing materials are to be used as parts of safety belts or as energy absorbing members installed on the outer parts of automobiles, those having densities higher than 0.2 g/cm$^3$ may be employed.

As mentioned above, according to the present invention, rigid polyurethane foams with closed cells of very large cell diameters can be obtained by adding a small amount of an additive consisting of diorganosilicone oil and silica to the conventional raw materials for preparing rigid polyurethane foam, followed by foaming the mixture thus prepared. The resultant products have characteristic curves such that the plateau displacement is very long, thereby providing for maximum energy absorption. Thus, the products of the present invention can be employed for those portions of automobiles and the like, with which portions of the human body or the other objects would collide in the event of impact and shock attendant upon the various types of accidents which may occur. Thus it will be understood that the products of the present invention may contribute significantly to the solution of problems including traffic safety problems and the like, which have recently come to the fore.

Further details of the present invention will be explained by the following examples:

EXAMPLE 1

The commercially available resin, cross-linking agent, blowing agent, catalyst and bubble-stabilizing agent as recited in the following Table 1 were employed as the basic raw materials. An additive was added to said basic raw materials which in turn were mixed thoroughly in a mixer. Then, the mixture was fully agitated and poured in a closed-type mold. The mixture was then foamed at various expansion ratios at room temperature. The additive used was a mixture of diorganosilicone oil having the formula of $R_2SiO$, wherein R represents a monovalent hydrocarbon group, and silica, (the content of silica in the oil - silica combination being from 15 to 65% by weight). The additive is commercially available and belongs to the oil compound-type type silicone-system antifoaming agent.

Table 1 shows the materials used and the amounts thereof.

TABLE 1

| Component | Material Content | Trade-name | Amount (parts by weight) |
| --- | --- | --- | --- |
| resin | polyetherpolyol | SUNNIX R-P410A | 100 |
| cross-linking agent | diphenylmethane-diisocyanate | CRUDE MDI | 100 |
| blowing agent | Freon | FREON R-11 | 39 |
| catalyst | N,N-dimethyl-cyclohexylamine | POLYCAT No. 8 | 2.3 |
| bubble-stabilizing agent | silicone-type | F305 | 0.6 |
| additive | oil-compound type silicone-system antifoaming agent | X-20-201 | 0<br>0.0016<br>0.0033<br>0.0066<br>0.0165<br>0.033<br>0.10 |

Note: F 305 is polydimethyl siloxane-polyoxyalkylene copolymer. X-20-201 is 35% dimethylsilicone oil and 65% $SiO_2$ by weight. The dimethylsilicone oil must, of course, be liquid.

Table 1A lists the manufacturers of the various materials of Table 1.

TABLE 1A

| Tradename | Manufacturer |
| --- | --- |
| SUNNIX R-P410A | Sanyo Kasei Kogyo Kabushiki Kaisha |
| CRUDE MDI | Nihon Poriuretan Kogyo Kabushiki kaisha |
| FREON R-11 | Mitsui Furoro Kemikaru kabushiki Kaisha |
| POLYCAT No. 8 | San Abotto |
| F 305 | Shinetsu kagaku Kogyo Kabushiki Kaisha |
| X-20-201 | Shinetsu kagaku Kogyo Kabushiki Kaisha |

Table 1B gives details as to the composition and properties of the various products.

TABLE 1B resin - SUNNIX R-P410A
   A polyetherpolyol resin made by the addition of propylene oxide to sucrose which is a polyfunctional initiator having a functionality of 8.
   hydroxyl value: 400 – 440 (mg KOH per g.)
   pH : 9.0 – 11.0
   Viscosity : about 55 poises (at 25°C).
cross-linking agent - CRUDE MDI
   NCO content : 30.0 – 32.0%
   specific gravity : 1.23 – 1.24 (at 25°C)

TABLE 1B-continued

```
viscosity            : 100 – 250 centipoises (at 25°C).
blowing agent - FREON R-11
    composition      : CCl₃F (trichloromonofluoro
                       methane)
```

```
            molecular weight  : 137.38
            boiling point     : 23.77°C
bubble-stabilizing agent - F305
            viscosity         : 40 centistokes (at 25°C)
            specific gravity  : 1.05 (at 25°C)
            pH                : 5.7
additive - X-20-201
            specific gravity  : 1.0 (at 25°C)
            viscosity         : 150 poises (at 25°C).
```

The cell diameters of the rigid polyurethane foams obtained were determined by microscopic observation.

The relations between the amounts of additive used and the mean cell diameter in finished products are shown in Table 2 below.

TABLE 2

| Amount of additive used (parts by weight) | 0 | 0.0016 | 0.0033 | 0.0066 | 0.0165 | 0.033 | 0.10 |
|---|---|---|---|---|---|---|---|
| Cell diameter (mm) | 0.3 | 1 | 3 | 5 | 9 | 13 | satisfactory foam not obtained |

Test pieces measuring 40 × 40 × 40 mm were cut from the rigid polyurethane foams thus prepared to determine the relationship between cell diameter and energy absorbing properties. The tests were conducted by placing a test piece on the Instron (Instron is a registered trade mark) type universal testing machine, setting the bottom face of the test piece closely on a sample stand and the top face closely on the pressing plate, and pressing down said plate at a velocity of 50 mm/min to compress said test piece in the axial direction. The load-displacement curve was obtained by measuring the load acting on the pressing plate and the corresponding deformation of the test piece in its axial direction. Then, two types of test pieces were selected and they were gathered into two groups, one having the plateau load of 27 mg and the other having a plateau load of 100 kg. Then, the relations between cell diameters and plateau displacement of the test pieces were studied, determining the corresponding amounts of energy absorbed.

Figure 2:
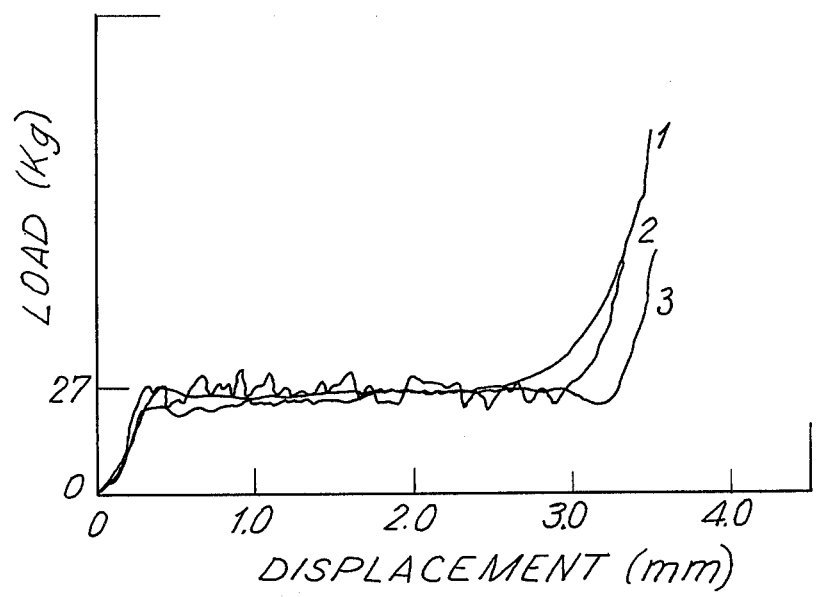
FIGS. 2, 3 and 4 compare characteristic load-displacement curves for rigid polyurethane foams of the present invention with those of prior art products.
Figure 3:
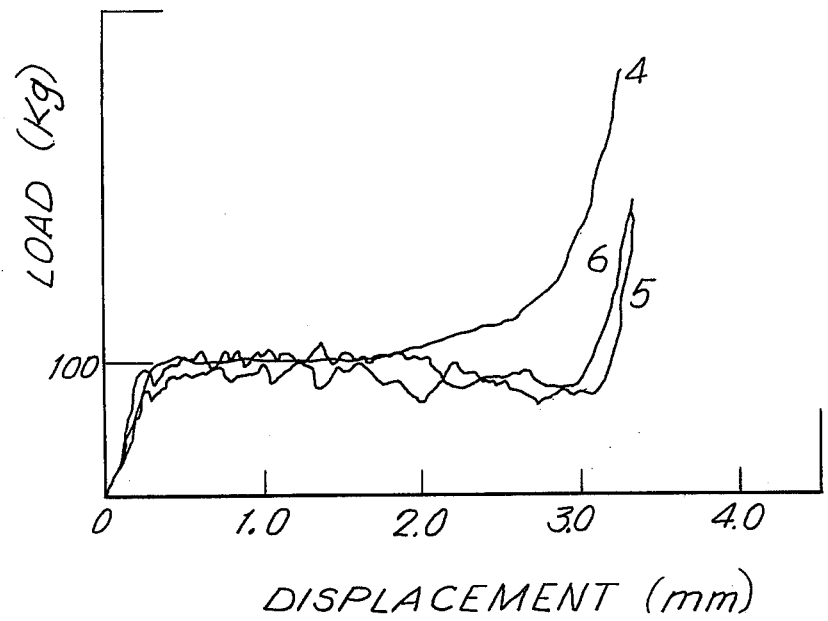

The results are shown in Table 3. FIGS. 2 and 3 show the load displacement curves corresponding to the experimental results recited in Table 3. The reference numerals in FIGS. 2 and 3 correspond to those of test pieces in Table 3. Microscopic photographs of the test pieces 1 and 3 are shown in FIGS. 5 and 6, respectively. FIG. 7 shows the photographs of the appearance of cells obtained by cutting the test piece No. 3. As is obvious from FIGS. 6 and 7, the cell is composed of the "cell-strands," which appear in the form of an ellipse or a polygon, and the "cell-wall" which lies between the cell-strands.

TABLE 3

| Group | Sample No. | Cell diameter (mm) | Density (g/cm³) | plateau load (kg) | plateau displacement (cm) | Amount of energy absorbed at plateau portion (kg-cm) |
|---|---|---|---|---|---|---|
| I | 1 | 0.3 | 0.034 | 27 | 2.7 | 65 |
|   | 2 | 3   | 0.038 | 27 | 3.0 | 76 |
|   | 3 | 9   | 0.043 | 27 | 3.3 | 70 |
| II | 4 | 0.3 | 0.077 | 100 | 2.3 | 190 |
|   | 5 | 3   | 0.080 | 100 | 3.2 | 240 |
|   | 6 | 9   | 0.099 | 100 | 3.1 | 230 |

In the above table, Samples 1 and 4 are rigid polyurethane foams prepared by the prior art process without using such an additive as used in the present invention. The difference in density of Samples 1 and 2 depends on the difference in expansion ratios employed in the process of the production of the samples.

As is clearly shown in FIGS. 6 and 7, rigid polyurethane foam having remarkably large cell diameters can be obtained according to the process of the present invention, by foaming the mixture of the basic raw materials and the specified additive. In addition, as is evident from FIGS. 2 and 3 as well as Table 3, the plateau displacement of the rigid polyurethane foams having larger cell diameters is greater than that of rigid polyurethane foams having smaller cell diameters. Thus, it can be seen that the amount of energy to be absorbed by the former is greater than that of the latter.

The plateau displacement pattern exhibits a "wave" form in the load-displacement characteristic curve, with the increase in the cell diameter of rigid polyurethane foams beyond about 10 mm. This is because there results some change in load due to large cell diameters, during rupture of cells of rigid polyurethane foams caused by the pressure applied by the body to be protected. Such variation of load, however, will not bring about any serious problem to the human body to be protected, so long as the cell diameter of the rigid polyurethane foam employed does not exceed about 10 mm. The variation of the load, however, becomes serious when the cell diameter is in the range of 12–13 mm. In such a case, the energy absorbing capacity of the rigid polyurethane foam also decreases somewhat. It is for this reason that the range of 3 – 10 mm is preferred.

From the above results it may be seen that when the plateau load is near the maximum which the body can tolerate, the use of the additive disclosed herein lengthens the plateau displacement, thereby maximizing the safe energy absorption of the foam.

EXAMPLE 2

The rigid polyurethane foam was prepared by foaming the mixture of the specified additive and the basic raw materials including tolylenediisocyanate as a cross-linking agent. The additive used was of the same type as used in Example 1. The materials and the amount thereof are shown in Table 4 below.

TABLE 4

| Material | | | Amount (parts by weight) |
|---|---|---|---|
| Component | Content | Trade-name | |
| resin | polyetherpolyol | SUNNIX R-P410A | |
| cross-linking agent | tolylenediiso-cyanate | TDI-80 | 90 |
| blowing agent | Freon | FREON R-11 | 19 |
| catalyst | N,N-dimethyl-cyclohexylamine | POLYCAT No. 8 | 2.5 |
| bubble-stabilizing agent additive | silicone-type oil-compound type silicone system anti-foaming agent | F 305 X-20-201 | 0.8 0, 0.003 0.007, 0.01 0.015 0.07 |

Note: TDI-80 is manufactured by Mitsui Toatsu kagaku kabushiki Kaisha.

The relationship between the cell diameter of rigid polyurethane foam thus prepared and the amount of additive used is shown in Table 5 below.

TABLE 5

| Amount of additive used (parts by weight) | 0 | 0.003 | 0.007 | 0.01 | 0.015 | 0.07 |
|---|---|---|---|---|---|---|
| Cell diameter (mm) | 0.3 | 4 | 8 | 10 | 12 | satisfactory foam not obtained |

With respect to rigid polyurethane foams obtained by the above procedure, the load-displacement characteristic curve was examined according to the procedure used in Example 1.

With the samples having a plateau of 45 kg, the experimental results concerning the relationship between the cell, diameter and the energy absorbing capacity were as shown in Table 6 below.

TABLE 6

| Sample No. | Cell diameter (mm) | Density (g/cm$^3$) | Plateau load (kg) | Plateau Displacement (cm) | Amount of energy absorbed at plateau portion (kg . cm) |
|---|---|---|---|---|---|
| 7 | 0.3 | 0.046 | 45 | 2.8 | 77 |
| 8 | 8 | 0.055 | 45 | 3.3 | 120 |
| 9 | 10 | 0.064 | 45 | 3.4 | 110 |
| 10 | 12 | 0.072 | 45 | 3.3 | 100 |

Figure 4:
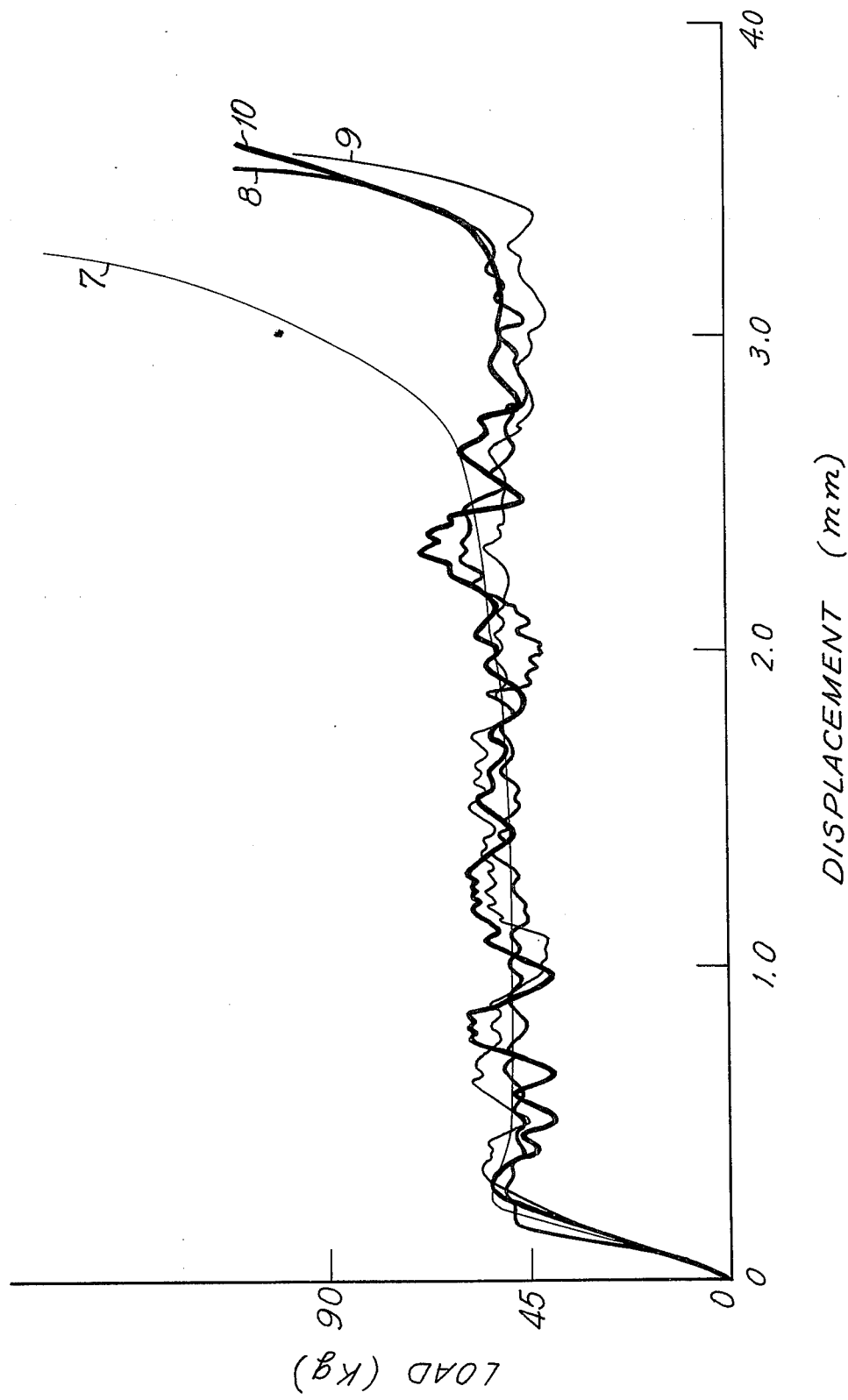

Sample 7 is the rigid polyurethane foam obtained by the prior art process. From the table, it is evident that rigid polyurethane foams obtained by adding the specific additive disclosed herein have larger cell diameters and are superior in energy absorbing capacity to the prior art product. The load-displacement curves for these samples are shown in FIG. 4.

EXAMPLE 3

A mixture was prepared by adding to the same basic raw materials as used in Example 1 the additive in the emulsion state made by adding 70% of water to the same type of diorganosilicone oil containing silica as used in Example 1 (commercially available emulsion type silicone-system antifoaming agent in the market under the trade-name of KM 72 or SH 5501), the amount of the additive being 0.04 parts by weight and 0.01 parts by weight, respectively, per 100 parts by weight of polyetherpolyol in said mixture.

The mixture thus prepared was foamed at room temperature in a mold. The density was 0.08 g/cm$^3$.

The mean cell diameter of the products made by using KM 72 and SH 5501, were 7 mm and 3 mm, respectively. The plateau displacement in the load-displacement curve was greater than that of the product made without using the additive.

KM 72 (specific gravity at 25°C is 1.02 and pH is 5.5) is made by Shinetsu Kagaku Kogyo Kabushiki Kaisha and SH 5501 (specific gravity at 25°C is 1.0 and pH is 5.5) is made by Tore Shuikon Kalushiki Kahska. KM 72 is an emulsion consisting of 10% dimethyl silicone oil, 20% SiO$_2$ and 70% water plus a small quantity of any suitable nonionic surface active agent. SH 5501 is 15% dimethyl silicone oil, 15% SiO$_2$, 70% water and enough nonionic emulsifying agent to provide a stable emulsion.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process for producing a rigid polyurethane foam for absorbing maximum kinetic energy in a collision with a human body without injury to same, comprising mixing a polyol for rigid foam as a resin, an isocyanate as a cross-linking agent, a chlorofluorocarbon as a blowing agent, a catalyst for promoting the reaction of said polyol with said isocyanate, a bubble-stabilizing agent for aiding in uniform bubble formation, and an additive comprising a diorganosilicone oil and silica in a ratio ranging from 1.1 to 1.2, said diorganosilicone oil including a member selected from the group consisting of substituted and unsubstituted hydrocarbon groups, said additive being used in an amount from 0.003 – 0.02 parts by weight per 100 parts by weight of said polyol and foaming the resultant mixture to produce rigid polyurethane foam having closed cells with a cell diameter ranging from 3 mm to 13 mm.

2. The process as defined in claim 1 wherein the silicon atoms in said diorganosilicone oil have attached thereto two monovalent hydrocarbon groups wherein each monovalent hydrocarbon group is selected from a first subgroup consisting of a methyl group, an ethyl group and a phenyl group, all of said groups being unsubstituted, and a second subgroup consisting of a methyl group, an ethyl group and a phenyl group, all of said groups being substituted.

3. The process as defined in claim 2 wherein said substituted hydrocarbon group is selected from the group consisting of a trifluoropropyl group and a trichloroethyl group.

4. The process as defined in claim 2 wherein said diorganosilicone oil is dimethylsilicone oil.

5. The process as defined in claim 1 wherein said diorganosilicone oil and said silica are added in the form of an emulsion.

6. The process as defined in claim 5 wherein said emulsion is a water emulsion.

7. The product resulting from the process as defined in claim 1.

* * * * *